United States Patent
Bellert

(10) Patent No.: US 10,572,587 B2
(45) Date of Patent: Feb. 25, 2020

(54) TITLE INFERENCER

(71) Applicant: Konica Minolta Laboratory U.S.A., Inc., San Mateo, CA (US)

(72) Inventor: Darrell Eugene Bellert, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 86 days.

(21) Appl. No.: 15/897,911

(22) Filed: Feb. 15, 2018

(65) Prior Publication Data

US 2019/0251163 A1 Aug. 15, 2019

(51) Int. Cl.
| | |
|---|---|
| *G06F 17/27* | (2006.01) |
| *G06N 5/04* | (2006.01) |
| *G06F 17/22* | (2006.01) |
| *G06F 17/21* | (2006.01) |
| *G06F 17/24* | (2006.01) |

(52) U.S. Cl.
CPC ........ *G06F 17/2745* (2013.01); *G06F 17/218* (2013.01); *G06F 17/2247* (2013.01); *G06F 17/241* (2013.01); *G06F 17/274* (2013.01); *G06F 17/2705* (2013.01); *G06F 17/2715* (2013.01); *G06N 5/048* (2013.01)

(58) Field of Classification Search
CPC .. G06F 17/2247; G06F 17/218; G06F 17/241; G06F 17/2705
See application file for complete search history.

(56) References Cited

U.S. PATENT DOCUMENTS

| | | | | |
|---|---|---|---|---|
| 5,438,512 A | * | 8/1995 | Mantha | G06F 17/211 704/1 |
| 5,893,916 A | * | 4/1999 | Dooley | G06F 17/2264 715/234 |
| 6,035,061 A | * | 3/2000 | Katsuyama | G06K 9/00469 382/177 |
| 6,088,711 A | * | 7/2000 | Fein | G06F 17/274 715/269 |

(Continued)

OTHER PUBLICATIONS

Extended European Search Report issued in corresponding European Application No. 19155375.9, dated Jul. 12, 2019 11 pages).

(Continued)

*Primary Examiner* — Samuel G Neway
(74) *Attorney, Agent, or Firm* — Osha Liang LLP

(57) ABSTRACT

A method for processing an electronic document (ED) to infer titles in the ED is provided. The method includes: generating a mark-up version of the ED comprising text-styling attributes, text-layout attributes, and text content information of characters included in the ED; generating statistical information of the text-styling and text-layout attributes; calculating, for each text-styling and text-layout attribute, a relative weight score; calculating, for each paragraph in the ED: a styling criteria score and a layout criteria score based on the statistical information and the relative weight scores; a text content score based on the text content information; and a title confidence score based on the styling criteria score, the layout criteria score, and the text content score; and generating a metadata for the ED that includes the title confidence score for each paragraph for use in inferring the titles in the ED.

20 Claims, 9 Drawing Sheets

(56) References Cited

U.S. PATENT DOCUMENTS

| | | | | |
|---|---|---|---|---|
| 6,298,357 | B1* | 10/2001 | Wexler | G06F 17/272 |
| | | | | 715/210 |
| 8,386,943 | B2 | 2/2013 | Wang et al. | |
| 9,508,043 | B1* | 11/2016 | Schlachter | G06F 16/93 |
| 2002/0034328 | A1* | 3/2002 | Naoi | G06K 9/2054 |
| | | | | 382/176 |
| 2002/0118379 | A1* | 8/2002 | Chakraborty | G06F 17/2241 |
| | | | | 358/1.9 |
| 2003/0156754 | A1* | 8/2003 | Ouchi | G06K 9/00469 |
| | | | | 382/176 |
| 2004/0006742 | A1* | 1/2004 | Slocombe | G06F 17/2205 |
| | | | | 715/234 |
| 2006/0224952 | A1* | 10/2006 | Lin | G06F 17/2247 |
| | | | | 715/209 |
| 2007/0294614 | A1* | 12/2007 | Jacquin | G06F 17/2247 |
| | | | | 715/230 |
| 2011/0075932 | A1* | 3/2011 | Komaki | G06K 9/00463 |
| | | | | 382/190 |
| 2016/0232143 | A1* | 8/2016 | Fickenscher | G06F 16/955 |

OTHER PUBLICATIONS

Giovanni Giuffrida et al., "Knowledge-Based Metadata Extraction from PostScript files"; ACM 2000 Digital Libraries. Proceedings of The 5th. ACM Conference on Digital Libraries; Jun. 1, 2000; pp. 77-84 (8 pages).

Yunhua Hu et al., "Automatic extraction of titles from general documents using machine learning", Information Processing & Management; Elsevier, Barking, GB, vol. 42, No. 5; Sep. 1, 2006; pp. 1276-1293 (18 pages).

* cited by examiner

| TEXT-STYLING AND TEXT-LAYOUT ATTRIBUTES | PREDETERMINED WEIGHT SCORE |
|---|---|
| OOXML_STYLE_NAME | 0.5 |
| FONT_SIZE | 0.15 |
| CENTERING | 0.15 |
| BOLD | 0.05 |
| UNDERLINE | 0.05 |
| WHITESPACE | 0.05 |
| FONT_NAME | 0.025 |
| FONT_COLOR | 0.025 |

FIG. 3D

| TEXT-STYLING ATTRIBUTE | VARIATION | FREQUENCY |
|---|---|---|
| OOXML_STYLE_NAME | "" | 745 |
| FONT_SIZE | 11 | 707 |
| | 14 | 9 |
| | 16 | 29 |
| BOLD | false | 707 |
| | true | 38 |
| UNDERLINE | false | 698 |
| | true | 47 |
| FONT_NAME | Calibri | 745 |
| FONT_COLOR | black | 745 |

FIG. 3E

| PAGE NUMBER | CONTENT BOUNDING BOX |
| --- | --- |
| 1 | left = 0.99 inches from the left<br>top = 1.08 inches from the top<br>right = 7.45 inches from the left<br>bottom = 3.67 inches from the top |

FIG. 3F

| PARAGRAPH NUMBER | VERTICAL SPACING | LINE NUMBER | HORIZONTAL SPACING |
| --- | --- | --- | --- |
| 1 | before = 0 inches<br>after = 0.21 inches | 1 | before = 1.69 inches<br>after = 1.65 inches |
| 2 | before = 0.21 inches<br>after = 0.21 inches | 1 | before = 0 inches<br>after = 2.38 inches |
| 3 | before = 0.21 inches<br>after = 0.17 inches | 1 | before = 0 inches<br>after = 0.01 inches |
| | | 2 | before = 0.01 inches<br>after = 0.002 inches |
| | | 3 | before = 0.004 inches<br>after = 4.87 inches |

FIG. 3G

| VERTICAL SPACING SUMMARY | VALUE |
| --- | --- |
| average line spacing | 0.10 inches |
| average line spacing within paragraphs | 0.08 inches |
| average line spacing between paragraphs | 0.11 inches |
| smallest line spacing | 0 |
| largest line spacing | 0.22 inches |

FIG. 3H

| TEXT-STYLING AND TEXT-LAYOUT ATTRIBUTES | PREDETERMINED WEIGHT SCORE | RELATIVE WEIGHT SCORE | RELATIVE WEIGHT SCORE (SCALED) |
|---|---|---|---|
| OOXML_STYLE_NAME | 0.5 | 0 | 0 |
| FONT_SIZE | 0.15 | 0.15 | 0.3348 |
| CENTERING | 0.15 | 0.1480 | 0.3304 |
| BOLD | 0.05 | 0.05 | 0.1116 |
| UNDERLINE | 0.05 | 0.05 | 0.1116 |
| WHITESPACE | 0.05 | 0.05 | 0.1116 |
| FONT_NAME | 0.025 | 0 | 0 |
| FONT_COLOR | 0.025 | 0 | 0 |

FIG. 3I

| PARAGRAPH | LEADING WHITE SPACE | TRAILING WHITE SPACE | \|WHITE SPACE DELTA\| | WHITE SPACE SUM | Centering Score |
|---|---|---|---|---|---|
| 1 | 1.69 | 1.65 | 0.05 | 3.34 | 0.99 |
| 2 | 0 | 2.38 | 2.38 | 2.38 | 0 |
| 3 | 0 | 0.01 | 0.01 | 0.01 | 0 |
| | 0.01 | 0.002 | 0.008 | 0.012 | 0.33 |
| | 0.004 | 4.87 | 4.866 | 4.874 | 0.0016 |

FIG. 3J

| PARAGRAPH | TEXT-STYLING AND TEXT-LAYOUT ATTRIBUTES | Styling and Layout Scoring Functions | RELATIVE WEIGHT SCORE (SCALED) | FINAL STYLE AND LAYOUT SCORE | TEXT SCORE | TITLE CONFIDENCE SCORE |
|---|---|---|---|---|---|---|
| 1 | OOXML_STYLE_NAME | 0 | 0 | 0 | 0.87 | 0.68 |
|   | FONT_SIZE | 0.96 | 0.3348 | 0.3218 | | |
|   | CENTERING | 0.98 | 0.3304 | 0.3259 | | |
|   | BOLD | 0.95 | 0.1116 | 0.1059 | | |
|   | UNDERLINE | 0 | 0.1116 | 0 | | |
|   | WHITESPACE | 0.26 | 0.1116 | 0.0293 | | |
|   | FONT_NAME | 0 | 0 | 0 | | |
|   | FONT_COLOR | 0 | 0 | 0 | | |
| 2 | OOXML_STYLE_NAME | 0 | 0 | 0 | 0.72 | 0.07 |
|   | FONT_SIZE | 0 | 0.3348 | 0 | | |
|   | CENTERING | 0 | 0.3304 | 0 | | |
|   | BOLD | 0 | 0.1116 | 0 | | |
|   | UNDERLINE | 0.56 | 0.1116 | 0.0621 | | |
|   | WHITESPACE | 0.37 | 0.1116 | 0.0412 | | |
|   | FONT_NAME | 0 | 0 | 0 | | |
|   | FONT_COLOR | 0 | 0 | 0 | | |

FIG. 3K

TITLE INFERENCER

BACKGROUND

An electronic document (ED) (e.g., word processing document, spreadsheet, slide show, webpage, etc.) may include titles (e.g., a name, heading, legend, label, caption, etc.) that best describe certain contents within the ED. Often, texts within titles may be easier for users to recall. However, titles are not always explicitly identified (i.e., labeled and/or tagged) within the ED. Regardless, users still wish to search for the titles in the ED.

SUMMARY

In general, in one aspect, the invention relates to a method for processing an electronic document (ED) to infer a title in the ED, wherein the ED comprises a plurality of characters. The method comprises: generating a mark-up version of the ED comprising text-styling attributes, text-layout attributes, and text content information of the characters in the ED, wherein the characters are grouped into at least a first paragraph and a second paragraph based on the text-layout attributes, and each of the text-styling attributes and the text-layout attributes is associated with a predetermined weight score; generating statistical information of the text-styling and text-layout attributes; calculating, for each of the text-styling and text-layout attributes, a relative weight score based on the predetermined weight scores and the statistical information; calculating, for each of the first and second paragraphs: a styling criteria score and a layout criteria score based on the statistical information and the relative weight scores; a text content score based on the text content information; and a title confidence score based on the styling criteria score, the layout criteria score, and the text content score; and generating, for the ED, a metadata including the title confidence score for each of the first and second paragraphs for use in inferring titles in the ED.

In general, in one aspect, the invention relates to a system for processing an electronic document (ED) to infer a title in the ED, wherein the ED comprises a plurality of characters. The system comprises: a memory; and a computer processor connected to the memory that: generates a mark-up version of the ED comprising text-styling attributes, text-layout attributes, and text content information of the characters in the ED, wherein the characters are grouped into at least a first paragraph and a second paragraph based on the text-layout attributes, and each of the text-styling attributes and the text-layout attributes is associated with a predetermined weight score; generates statistical information of the text-styling and text-layout attributes; calculates, for each of the text-styling and text-layout attributes, a relative weight score based on the predetermined weight scores and the statistical information; calculates, for each of the first and second paragraphs: a styling criteria score and a layout criteria score based on the statistical information and the relative weight scores; a text content score based on the text content information; and a title confidence score based on the styling criteria score, the layout criteria score, and the text content score; and generates, for the ED, a metadata including the title confidence score for each of the first and second paragraphs for use in inferring titles in the ED.

In general, in one aspect, the invention relates to a non-transitory computer readable medium (CRM) storing computer readable program code for processing an electronic document (ED) to infer a title in the ED embodied therein, wherein the ED comprises a plurality of characters. The computer readable program code causes a computer to: generate a mark-up version of the ED comprising text-styling attributes, text-layout attributes, and text content information of the characters in the ED, wherein the characters are grouped into at least a first paragraph and a second paragraph based on the text-layout attributes, and each of the text-styling attributes and the text-layout attributes is associated with a predetermined weight score; generate statistical information of the text-styling and text-layout attributes; calculate, for each of the text-styling and text-layout attributes, a relative weight score based on the predetermined weight scores and the statistical information; calculate, for each of the first and second paragraphs: a styling criteria score and a layout criteria score based on the statistical information and the relative weight scores; a text content score based on the text content information; and a title confidence score based on the styling criteria score, the layout criteria score, and the text content score; and generate, for the ED, a metadata including the title confidence score for each of the first and second paragraphs for use in inferring titles in the ED.

Other aspects of the invention will be apparent from the following description and the appended claims.

BRIEF DESCRIPTION OF DRAWINGS

FIGS. 3A-3K show an implementation example in accordance with one or more embodiments of the invention.

DETAILED DESCRIPTION

Figure 1:
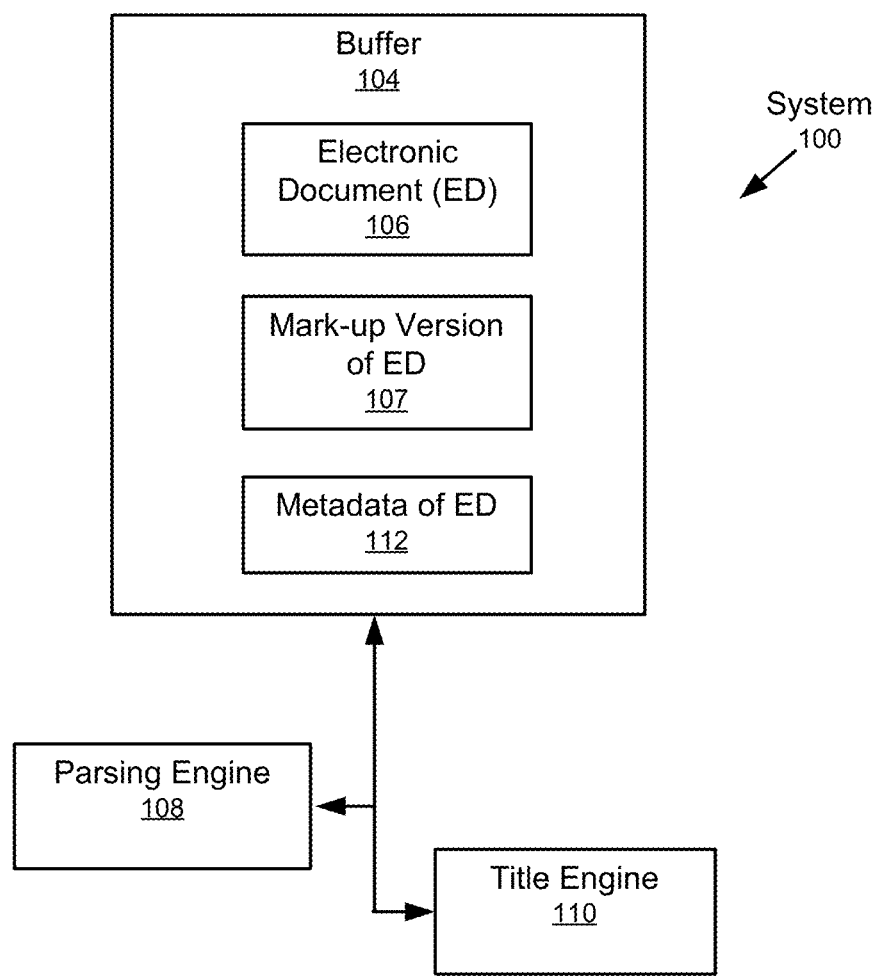
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system of processing an electronic document (ED) to infer a title (e.g., a name, heading, legend, label, caption, etc.) in the ED. Specifically, an electronic document (ED) including one or more lines of text is obtained and a mark-up version of the ED is generated by parsing the ED. The mark-up version of the ED includes content, layout, and styling information of characters that make up the lines of texts. One or more processes are executed on the mark-up version of the ED to group the lines of texts into paragraphs and calculate a title confidence score for each paragraph. With the title confidence score for each paragraph calculated, the title of the ED can be inferred even if the title is not explicitly identified (i.e., labeled and/or tagged).

FIG. 1 shows a system (100) in accordance with one or more embodiments of the invention. As shown in FIG. 1, the system (100) has multiple components, including, for example, a buffer (104), a parsing engine (108), and a title engine (110). Each of these components (104, 108, 110) may be located on the same computing device (e.g., personal computer (PC), laptop, tablet PC, smart phone, multifunction printer, kiosk, server, etc.) or on different computing devices connected by a network of any size having wired and/or wireless segments. Each of these components is discussed below.

In one or more embodiments of the invention, the buffer (104) may be implemented in hardware (i.e., circuitry), software, or any combination thereof. The buffer (104) is configured to store an electronic document (ED) (106) including one or more lines of text made up of characters. The ED (106) may also include images and graphics. The ED (106) may be obtained (e.g., downloaded, scanned, etc.) from any source. The ED (106) may be a part of a collection of EDs. Further, the ED (106) may be of any size and in any format (e.g., PDF, OOXML, ODF, HTML, etc.).

In one or more embodiments of the invention, the parsing engine (108) may be implemented in hardware (i.e., circuitry), software, or any combination thereof. The parsing engine (108) parses the ED (106) to extract content, layout, and styling information of the characters in the ED and generates a mark-up version of the ED (107) based on the extracted information. The mark-up version of the ED (107) may be stored in the buffer (104).

In one or more embodiments of the invention, the styling information may include one or more text-styling attributes that identify styling details of each character in the ED (106). For example, the text-styling attributes may include a style name attribute for OOXML, a heading tag for HTML, a font size attribute, a bold attribute, an underline attribute, a font name attribute, a font color attribute, etc. This is exemplified in more detail below with reference to FIGS. 3B and 3C.

In one or more embodiments of the invention, the layout information may include content bounding box information (e.g., a bounding box of all content on a single page of the ED (106) and bounding boxes for each line of text) and line spacing information. The layout information may be used to determine and/or calculate one or more text-layout attributes that identify the underlying structure of each line of text. For example, the layout information may include attributes such as a centering attribute, a white space attribute, etc. This is exemplified in more detail below with reference to FIGS. 3B and 3F to 3H.

In one or more embodiments of the invention, the parsing engine (108) identifies one or more paragraphs within the ED (106) using the text-layout attributes. In one or more embodiments, a paragraph in the ED (106) may include only a single line of text. Additionally, a paragraph may not necessarily begin with an indentation.

In one or more embodiments of the invention, the text content information may include a count of the characters ("a character count") in a single and/or all paragraphs of the ED (106). For example, a paragraph may be a grouping of one or more lines of text separated from one or more other groupings of lines of text by, for example, white space. This is exemplified in more detail below with reference to FIG. 3A.

In one or more embodiments of the invention, the title engine (110) may be implemented in hardware (i.e., circuitry), software, or any combination thereof. The title engine (110) is configured to calculate a title confidence score for each paragraph in the ED (106) and to identify (i.e., infer) possible titles in the ED (106) based on the title confidence score of each paragraph. In one or more embodiments, an ED (106) may not include a title or may have more than one title (i.e. potentially more than one paragraph having matching highest title confidence scores).

In one or more embodiments of the invention, the title engine (110) retrieves a set of predetermined weight scores for the text-styling and text-layout attributes. Each text-styling and text-layout attribute is associated with (i.e., tied to) a predetermined weight score within the set. The predetermined weight scores are determined by a user based on the user's consideration of which text-styling and text-layout attributes are most likely to indicate a precedence of a title (i.e., which text-styling and text-layout attributes are most commonly associated with titles found in EDs). For example, assume the user is aware that titles are more likely to include bold characters instead of a unique font color. The predetermined weight score for the bold attribute would be larger than the predetermined weight score for the font color attribute. As another example, assume the user is aware that titles are more likely to be centered than to include bold characters. The predetermined weight score for the centering attribute would be larger than the predetermined weight score for the bold attribute. This is exemplified in more detail below with reference to FIG. 3D.

In one or more embodiments of the invention, the set of predetermined weight scores may be stored in the buffer (108) and may be determined, accessed and/or modified by the user at any time. The predetermined weight scores may also be predefined by, for example, a configuration file associated with the ED and/or default parameters stored in the ED. In one or more embodiments, a sum of the predetermined weight scores is set to 1. Alternatively, the sum of the predetermined weight scores may be set to any constant (e.g., 10, 100, 0.1, 5, etc.).

In one or more embodiments of the invention, the title engine (110) identifies each text-styling and text-layout attribute in the mark-up version of the ED (107) and generates statistical information for each text-styling and text-layout attribute.

In one or more embodiments of the invention, the statistical information for each text-styling attribute may include a variability and a frequency of each text-styling attribute. The variability of a text-styling attribute may be determined based on a number of variations of the text-styling attribute that are identified. For example, if characters with font sizes of 11, 14, and 16 are identified in the ED (106) (i.e., 3 variations in font size are identified), then the variability of the font size attribute would be 3. As another example, assume there are characters in the ED (106) that are bold. The variability of the bold attribute would be 2 (e.g., true for characters that are bold and false for characters that are not bold). The frequency of a text-styling attribute may be determined based on a cardinality of the characters having each variation of the text-styling attribute. For example, assume the ED (106) has a total of 745 characters and 29 of the 745 characters have a font size of 16. The frequency of the font size attribute of 16 would be 29. This is exemplified in more detail below with reference to FIG. 3E.

In one or more embodiments of the invention, the statistical information for each text-layout attribute may include one or more values of the bounding box of all content on a single page of the ED (106) (i.e., values that describe the right, left, top, and bottom boundaries of all content on a single page of the ED (106)). The statistical information for each text-layout attribute may also include the amount of white space associated with each paragraph. This includes the amount of vertical white space (i.e., white space between the lines of text or the edge of the document or bounding box) and horizontal white space (i.e., the white space between the first and last characters in the line of text and a left and right border of the bounding box for all content on the page) of each line of text. The horizontal white space may be divided into a leading white space (i.e., the white space between the first character in the line of text and the left border of the bounding box of all content on the page) and a trailing white space (i.e., the white space between the final character in the line of text and the right border of the bounding box of all content on the page). This is exemplified in more detail below with reference to FIGS. 3A and 3F to 3H.

In one or more embodiments of the invention, the title engine (110) adjusts the predetermined weight scores for each of the text-styling and text-layout attributes to a relative weight score based on the statistical information of the text-styling and text-layout attributes. The adjustment may be performed by setting the relative weight score to a user defined value or calculating the relative weight score using the predetermined weight score and the statistical information of the text-styling and text-layout attributes. In one or more embodiments, the predetermined weight scores are adjusted to take into account that some text-styling and text-layout attributes are not interesting (i.e., not relevant) for the inference of a title in the ED (106), as reflected by the statistical information.

For example, assume the ED (106) is a PDF document. PDF documents do not include the style name attribute included in OOXML documents. Therefore, the predetermined weight score of the style name attribute is lowered (i.e., adjusted) to reflect that the style name attribute is not relevant to the present format of the ED (106) (i.e., PDF). As another example, in one or more embodiments: the predetermined weight score of all text-styling attributes with a variability of 1 (i.e. they do not vary) may be set to a relative weight score of 0; for the centering attribute, the relative weight score can be computed by scaling the predetermined weight score by a centering score (exemplified below) that reflects a paragraph in the ED (106) with the best centering (i.e., the most centered paragraph in the ED (106)); and for the white space attribute, setting the relative weight score to be the same as the predetermined weight score because all documents contain white space. This is exemplified in more detail below with reference to FIG. 3I.

The method for adjusting the predetermined weight scores is not limited to the examples described above. In one or more embodiments, other methods that take into account the relevance of each text-styling and text-layout attribute in the ED (106) based on the statistical information may be used to adjust the predetermined weight score.

In one or more embodiments of the invention, in the event that a sum of the relative weight scores is not equal to 1, the title engine (110) scales the relative weight scores so that the sum of the relative weight scores is equal to 1. This is exemplified in more detail below with reference to FIG. 3I. Alternatively, in the event that the sum of the relative weight score is not equal to the constant (e.g., 10, 100, 0.1, 5, etc.) set for the sum of the predetermined weight scores, the title engine (110) scales the relative weight scores so that the sum of the relative weight scores is equal to the set constant.

In one or more embodiments of the invention, the title engine (110) calculates a centering score for each paragraph in the ED (106). The centering score of a paragraph identifies the degree to which a paragraph is centered in the ED (106) (i.e., the lines of the paragraph are centered). The centering score may be calculated as a value between 0 to 1 with 0 being no centering and 1 being high degree of centering. Generally, titles are known to be centered. Therefore, paragraphs that are centered are more likely to be a title in the ED (106). In one or more embodiments, the centering score ("centering_score") is calculated, based on the trailing white space ("trailing_white_space") and leading white space ("leading_white_space") of each line of text, as:

$$centering\_score = 1 - (|leading\_white\_space - trailing\_white\_space|) \div (leading\_white\_space + trailing\_white\_space)$$

In one or more embodiments, the centering score used to calculate the relative weight score of the centering attribute may be the maximum centering score calculated for each paragraph in the ED (106).

The method for calculating the centering score is not limited to the example described above. In one or more embodiments, other methods that take into account the statistical information of the text-layout attributes and layout information of the ED (106) may be used to calculate the centering score.

In one or more embodiments of the invention, the title engine (110) calculates a white space score for each paragraph of the ED (106). The white space score of a paragraph is computed based on the amount of white space surrounding a paragraph (i.e., the amount of horizontal and vertical white space surrounding the paragraph). A high white space score indicates that the paragraph is most likely to be offset, which in general is associated to known layout of titles (i.e., titles are known to be offset within the body of EDs). The white space score is a value between 0 to 1 with 0 being the lowest score and 1 being the highest score. In one or more embodiments, the white space score ("white_space_score") of a line of text may be calculated as:

$$white\_space\_score = horiz\_white\_space\_score \times vert\_white\_space\_score$$

The horizontal white space score (horiz_white_space_score) may be calculated as:

$$horiz\_white\_space\_score = min\_max\_width \div content\_bounding\_box\_width$$

The min_max_width for a paragraph is a minimum value of a set containing a maximum horizontal white space of each line of text of the paragraph. For paragraphs with only a single line of text, the min_max_width is the maximum horizontal white space. For example, assume a paragraph includes three lines of text and the set containing the maximum horizontal white space of each of the three lines is X={0.01, 0.01, and 4.87}. The minimum value of 0.01 in set X is the min_max_width for that paragraph. The content_bouding_box_width is the width of the content bounding box for the page of the ED that includes the paragraph. For example, assume the paragraph is on page 1 of the ED and page 1 of the ED has a content bounding box with a left border at 0.99 and a right border at 7.45. The content_bouding_box_width is set to 6.46 (i.e., 7.45−0.99).

In one or more embodiments, the vertical white space score (vert_white_space_score) may be calculated by finding the maximum vertical white space of a paragraph and comparing the maximum vertical white space ("max_vert_white_space") to a minimum threshold value ("min_threshold") and a maximum threshold value ("max_threshold"). If the maximum vertical white space is greater than the maximum threshold value, the vertical white space score is set to 1. If the maximum vertical white space is less than the minimum threshold value, the vertical white space score is set to 0. If the maximum vertical white space is between the maximum and minimum threshold values, the vertical white space score may be calculated as ((max_vert_white_space−min_threshold)÷(max_threshold−min_threshold)). The maximum threshold value may be set as 1.5× an average line spacing of the ED (106) computed in the statistical information and the minimum threshold value may be set as 0.5 of the average line spacing. For example, assume the average line spacing of the ED (106) is 0.1, the maximum threshold value would be 0.15 and the minimum threshold value would be 0.05

The method for calculating the white space score is not limited to the example described above. In one or more embodiments, other methods that take into account the statistical information of the text-layout attributes and layout information of the ED (106) may be used to calculate the white space score.

In one or more embodiments of the invention, the title engine (110) calculates a styling criteria score for each paragraph of the ED (106). The styling criteria score may be a value between 0 to 1 that represents how closely the styling of the characters in the paragraph matches one or more styles that are generally associated with titles (i.e., known title styles) with 0 being not likely to be a title style and 1 being very likely to be a title style. The styling criteria score may be calculated as a sum of a final style score of each text-styling attribute. The final style score of a text-styling attribute is calculated based on a scoring function of the text-styling attribute (i.e., a styling scoring function) and the relative weight score of the text-styling attribute.

In one or more embodiments of the invention, to calculate a scoring function of a text styling attribute, the title engine (110) may calculate a uniqueness score and/or a desirability score of the text-styling attribute. In one or more embodiments of the invention, the uniqueness score reflects that a variation of a text-styling attribute is unique (i.e., special/rare) in the ED (106). The uniqueness score ("uniqueness_score") for a text-styling attribute may be calculated, for each paragraph, as:

$$uniqueness\_score = distribution\_ratio \times sparsity\_score$$

In one or more embodiments, the distribution_ratio reflects how often a most common variation of a text-styling attribute appears in the paragraph. For example, assume paragraph A of the ED includes a total to 29 characters and that 29 out of the 29 characters are bold (i.e., variation TRUE of the bold attribute). The distribution ratio for the bold attribute of paragraph A is 1 as a result of (29÷29).

In one or more embodiments, the sparsity_score reflects how rare a variation of a text-styling attribute is in the ED (106).

$$sparsity\_score = 1 - (num\_char\_variation \div total\_char\_ED)$$

For example, assume the same condition above, and further assume the ED (106) has a total character count ("total_char_ED") of 745 and 38 of the 745 characters are bold (i.e., variation TRUE of the bold attribute). The sparsity score of the bold attribute is 0.95 as a result of 1−(38÷745). Furthermore, the uniqueness score of the bold attribute of paragraph A is 0.95 as a result of (1×0.95).

In one or more embodiments of the invention, the desirability score reflects that a variation of a text-styling attribute is not only unique but also more likely to be associated with styles found in titles than the most common variation of the text-styling attribute in the ED (106). For example, assume the ED (106) includes characters with font sizes of 11, 14, and 16. The font size of 11 is the most common variation of the font attribute. The font size of 16 is the largest font size, and also more likely to be a font size of a title because texts in titles are generally known to be larger. The desirability score for the font attribute may be calculated based on the font size of 16 (i.e., the desired_variation). Each font size is also assigned a numerical value. For example, font size 11 may be assigned a value of 11 and font size 16 may be assigned a value of 16.

In one or more embodiments of the invention, the desirability score ("desirability_score") of a test-styling attribute may be calculated, for each paragraph, as:

$$desirability\_score = (most\_com\_var\_para - most\_com\_var\_ED) \div (desired\_variation - most\_com\_var\_ED)$$

For example, assume the same condition above where a document has font sizes of 11, 14, and 16 and the font size of 16 is selected as the desired_variation. The most common font size in the ED (106) ("most_com_var_ED") is 11 and the most common variation in paragraph B ("most_com_var_para") is the font size of 16. The desirability score for the font attribute of paragraph B would be calculated as (16−11)÷(16−11)=1.

In one or more embodiments of the invention, the scoring function for a text-styling attribute may be calculated, for each paragraph, as:

$$scoring\_function = uniqueness\_score$$

In one or more embodiments of the invention, when the desirability score is calculated for a text-styling attribute, the scoring function for a text-styling attribute may be calculated, for each paragraph, as:

$$scoring\_function = uniqueness\_score \times desirability\_score$$

In one or more embodiments of the invention, the title engine (110) calculates a layout criteria score for each paragraph of the ED (106). The layout criteria score may be a value between 0 to 1 that represents how closely the layout of a paragraph matches one or more layouts that are generally associated with titles (i.e., known title layouts) with 0 being not likely to be a title layout and 1 being very likely to be a title layout. The layout criteria score may be calculated as a sum of a final layout score of each text-layout attribute. The final layout score of a text-layout attribute is calculated based on a scoring function of the text-layout attribute (i.e., a layout scoring function) and the relative weight score of the text-layout attribute. In one or more embodiments, the centering and white space scores discussed above are layout scoring functions of the centering and white space attributes, respectively.

The method for calculating the scoring functions of the text-styling and text-layout attributes are not limited to the examples described above. In one or more embodiments, other methods that take into account the statistical information of the text-styling and text-layout attributes may be used to calculate the scoring functions of the text-styling and text-layout attributes.

In one or more embodiments of the invention, the title engine (110) calculates a text content score for each paragraph of the ED (106) based on the text content information. The text content score represents the likelihood of a paragraph being a title based on the character count of the paragraph. Titles are generally known to be shorter (i.e., contain less characters) and a higher text content score indicates that a paragraph is shorter (i.e., includes less characters) and is more likely to be a title.

In one or more embodiments of the invention, the text content score ("text_score") for a paragraph may be calculated as:

text_score=1−(par_visible_char_count÷largest_par_visible_char_count)

The par_visible_char_count represents a visible character count of the paragraph (i.e., character count that does not include the space between each word) for which the text_score is being calculated. The largest_par_visible_char_ count represents the visible character count of the largest paragraph in the ED (106). For example, assume the paragraph for which the text_score is being calculated includes a visible character count of 24 and the largest paragraph in the ED (106) includes a visible character count of 191. Therefore, the paragraph has a text content score of 0.87.

The method for calculating the text content score of a paragraph is not limited to the examples described above. In one or more embodiments, other methods that take into account the character count of each paragraph may be used to calculate the text content score of each paragraph.

In one or more embodiments of the invention, the title engine (110) calculates the title confidence score for each paragraph using the styling criteria score, the layout criteria score, and text content score for each paragraph. In one or more embodiments, the title confidence score may be a constant between 0 to 1, and a title confidence score closer to 1 indicates that a paragraph is more likely to be a title in the ED (106).

In one or more embodiments of the invention, the title confidence score for a paragraph may be calculated as:

title_confidence_score=(styling_criteria_score+layout_criteria_score)×text_score For example, assume a paragraph has a styling criteria score of 0.4277, a layout criteria score of 0.3552, and a text content score of 0.87. The title confidence score of the paragraph is 0.68, which indicates that the paragraph has a higher likelihood to be a title of the ED (106).

The method for calculating the title confidence score of a paragraph is not limited to the example described above. In one or more embodiments, other methods that take into account the statistical information of the text-styling and text-layout attributes, the text content information, and the relative weight scores may be used to calculate the title confidence score of each paragraph.

In one or more embodiments of the invention, the title engine (110) generates metadata (112) for the ED (106) that includes the title confidence score of each paragraph and stores the metadata (112) in the buffer (104). Alternatively, in one or more embodiments, the title engine (110) stores the title confidence scores back into the mark-up version of the ED (107). In one or more embodiments, the metadata (112) may be stored in an external buffer and retrieved by the title engine (110) whenever the title of the ED (106) needs to be inferred.

In one or more embodiments of the invention, the title engine (110) receives a request from a user to search for a title within the collection of EDs that include a search term (e.g., text that appears in the title). The title engine (110) parses the collection of EDs to identify paragraphs that include the search term. The title engine (110) retrieves EDs within the collection that include paragraphs with the search term and compares the title confidence score of each paragraph. After comparing the title confidence scores of each paragraph, the title engine (110) displays the retrieved EDs on a display screen starting with the ED including the largest determined title confidence score to the ED including the smallest determined title confidence score for the paragraph that includes the search term. For example, assume the collection of EDs includes document A and document B. Document A includes a paragraph with the search term and the title confidence score of the paragraph is 0.68. Document B includes a paragraph with the search term and the title confidence score of the paragraph is 0.07. The title engine (110) will retrieve both Document A and Document B and display Document A before Document B.

Although the system (100) is shown as having three components (104, 108, 110), in other embodiments of the invention, the system (100) may have more or fewer components. Further, the functionality of each component described above may be split across components. Further still, each component (104, 108, 110) may be utilized multiple times to carry out an iterative operation.

Figure 2:
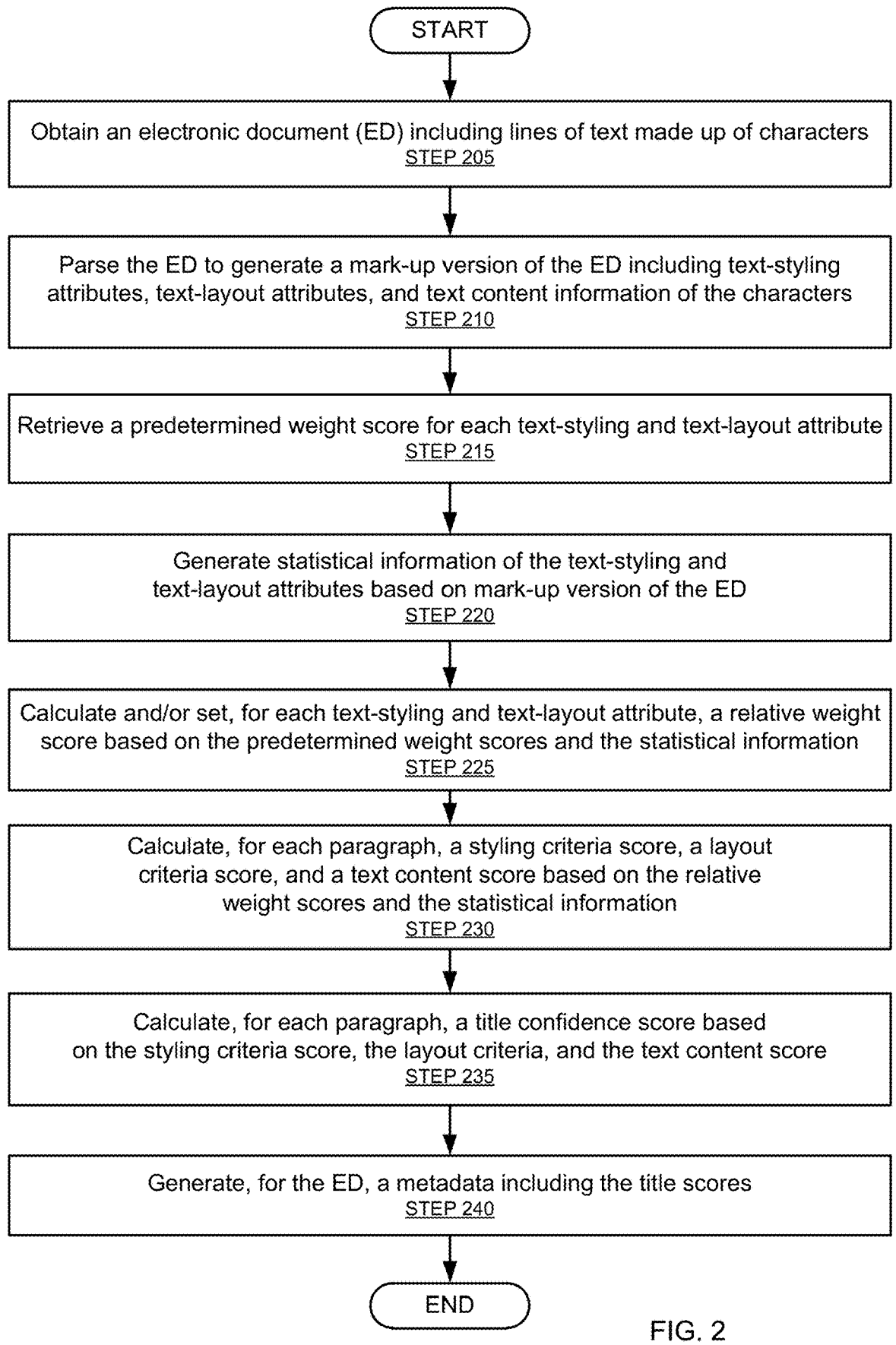
FIG. 2 shows a flowchart in accordance with one or more embodiments of the invention.

FIG. 2 shows a flowchart in accordance with one or more embodiments of the invention. The flowchart depicts a process for inferring a title in an electronic document (ED). One or more of the steps in FIG. 2 may be performed by the components of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Referring to FIG. 2, initially, an ED including one of more lines of text made up of characters is obtained (STEP 205). The one or more lines of text form paragraphs in the ED. The ED may also include images and graphics. The ED may be obtained (e.g., downloaded, scanned, etc.) from any source. The ED may be part of a collection of EDs. Further, the ED may be of any size and in any format (e.g., PDF, OOXML, ODF, HTML, etc.).

In STEP 210, as discussed above in reference to FIG. 1, the ED is parsed to generate a mark-up version of the ED including text-styling attributes, text-layout attributes, and text content information of the characters.

In STEP 215, as discussed above in reference to FIG. 1, a set of predetermined weight scores is retrieved for the text-styling and text-layout attributes. In one or more embodiments, each text-styling and text-layout attribute is associated (i.e., tied to) a predetermined weight score in the set.

In STEP 220, as discussed above in reference to FIG. 1, statistical information of the text-styling and text-layout attributes are generated using the mark-up version of the ED.

In STEP 225, as discussed above in reference to FIG. 1, a relative weight score is calculated and/or set for each text-styling and text-layout attribute based on the predetermined weight scores and the generated statistical information.

In STEP 230, as discussed above in reference to FIG. 1, a styling criteria score, a layout criteria score, and a text content score are calculated for each paragraph using the relative weight scores and the generated statistical information.

In STEP 235, as discussed above in reference to FIG. 1, a title confidence score is calculated for each paragraph in the ED using the styling criteria score, the layout criteria score, and the text content score of each paragraph.

In STEP 240, as discussed above in reference to FIG. 1, metadata storing the title confidence score for each paragraph in the ED is generated and stored in a same buffer where the ED is stored. Alternatively, the buffer may be a different buffer without the ED. In one or more embodiments, the title confidence scores are stored back into the mark-up version of the ED.

FIGS. 3A-3K show an implementation example in accordance with one or more embodiments of the invention. In one or more embodiments, the example calculation methods described above in reference to FIG. 1 are applied in the implementation example shown in FIGS. 3A-3K. However, it will be apparent to one of ordinary skill in the art that different calculation methods may be applied.

Figure 3A:
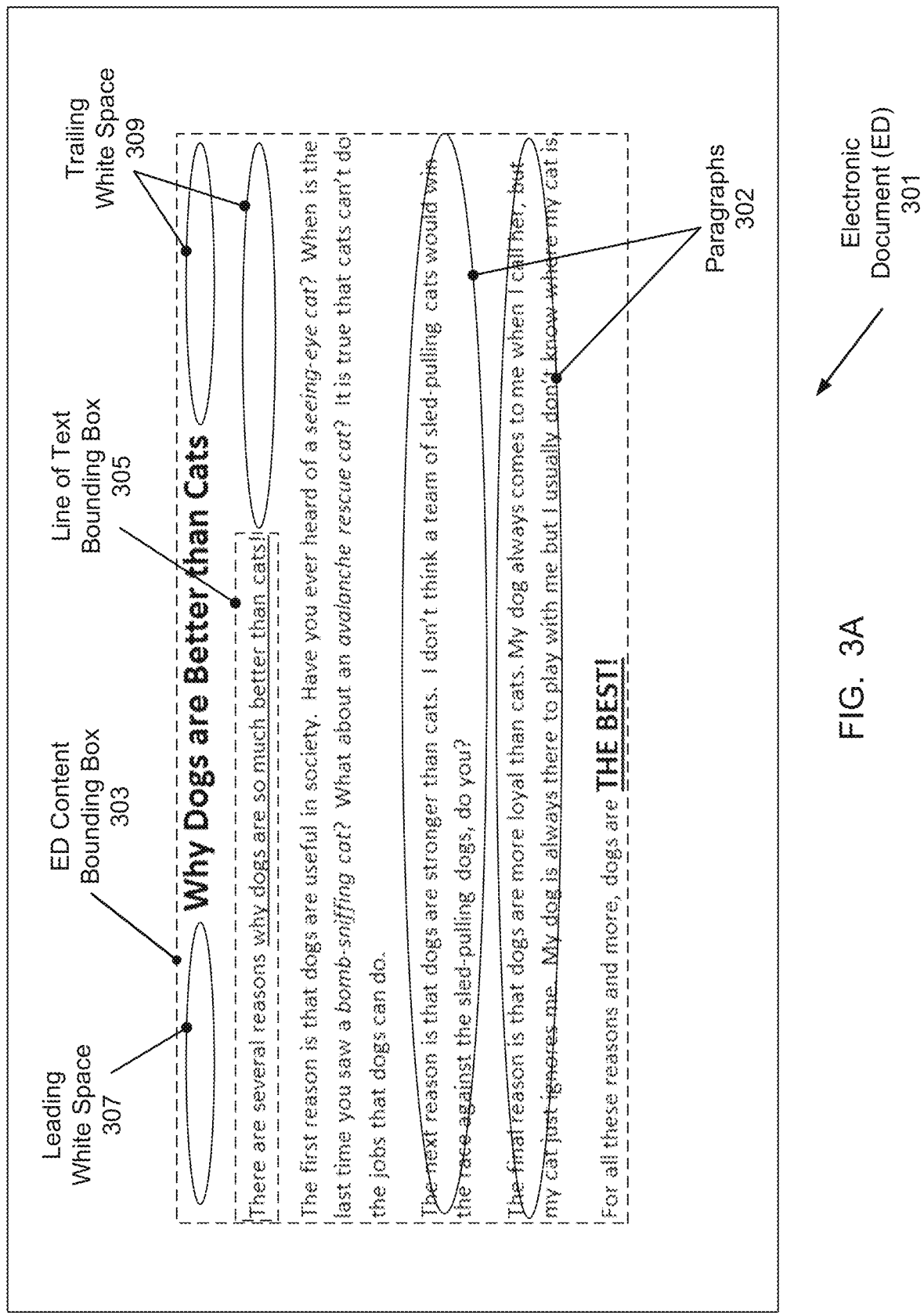

FIG. 3A shows an electronic document (ED) (301) that includes one or more lines of text made up of characters. Each of the lines of text may be grouped into paragraphs (302). As seen in FIG. 3A, there are six total paragraphs (302) (some paragraphs are unmarked for purposes of readability) including Paragraphs 1 to 6 counting from top to bottom. Each paragraph (302) may include a single or multiple lines of text. Each paragraph (302) also does not require an indentation.

As seen in FIG. 3A, all of the paragraphs (302) are enclosed within an ED content bounding box (303). In one or more embodiments, the ED content bounding box (303) defines an underlying structure of all content in a single page of the ED (301). The ED content bounding box (303) may be defined by the margins set for the page.

As seen in FIG. 3A, a line of text bounding box (305) defines the underlying structure of a line of text within the ED content bounding box (303). Each line of text in the ED (301) includes the line of text bounding box (305). Each line of text may also include a leading white space (307) and a trailing white space (309), as described above in reference to FIG. 1. The line of text bounding box (305) and the ED content bounding box (303) are used to calculate the leading white space (307) and trailing white space (309) of each line of text.

Figure 3B:
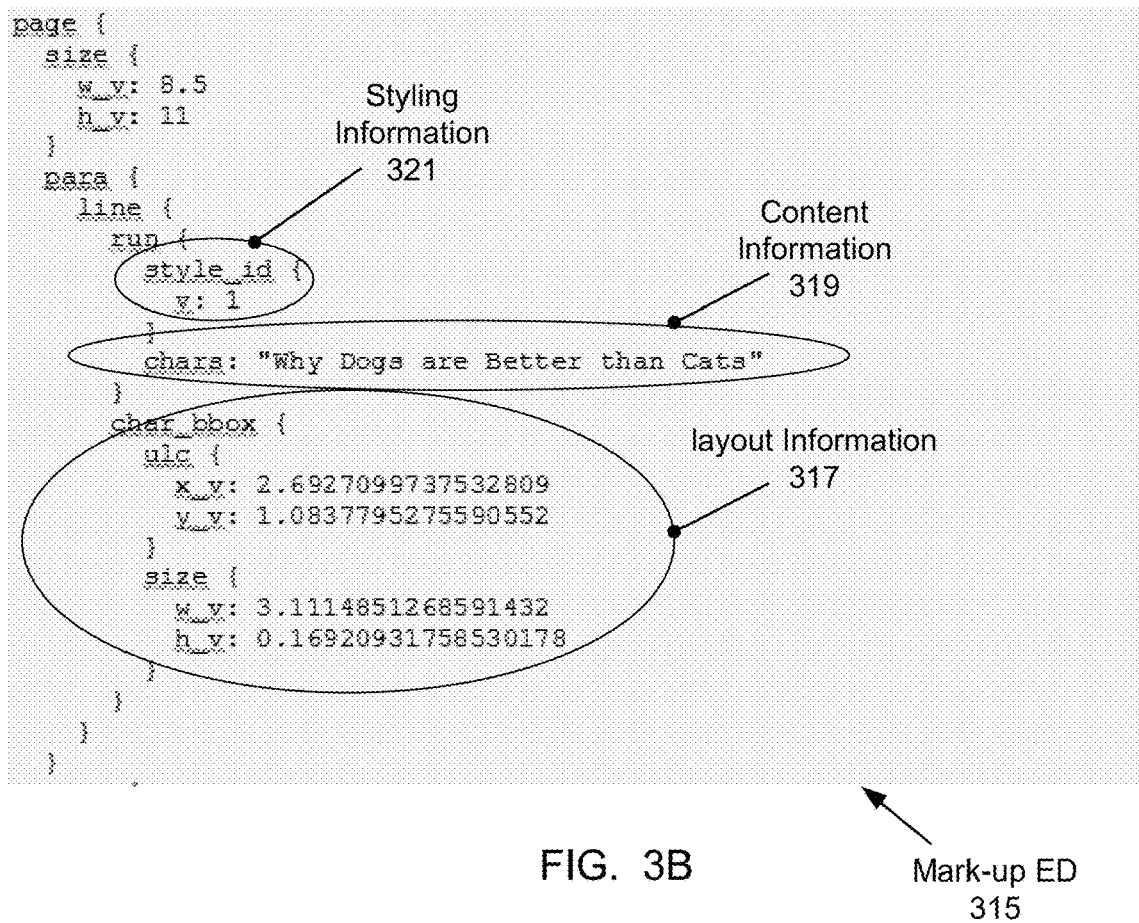

FIG. 3B shows a portion of a mark-up version of the ED (315) ("mark-up ED"). As seen in FIG. 3B, the mark-up ED (315) includes styling information (321), layout information (317), and content information (319) for the characters in Paragraph 1 (i.e., the top-most paragraph) of the ED (301). As seen in FIG. 3B, the styling information (321) is presented as a variable (i.e., v: 1) that defines various features or aspects (i.e., styling) of the text (i.e., style_id). The layout information (317) includes the dimensions of the line of text bounding box (305) shown in FIG. 3A, which are used for calculating text-layout attributes of the ED (301). The content information (319) includes all of the characters in the line of text that are applied with the styling information (321).

Figure 3C:
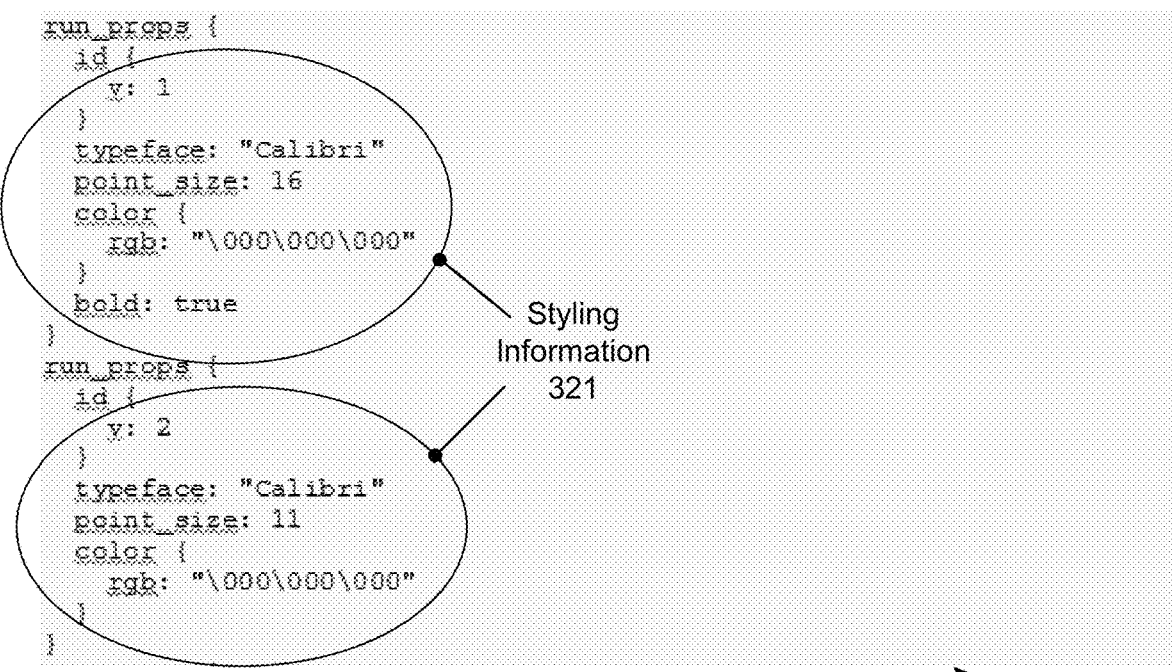

FIG. 3C shows a partial portion of mark-up ED (315). As seen in FIG. 3C, the styling information (321) includes the text-styling attributes (e.g., font, font size, font color, bold) of the characters in the ED (301).

FIG. 3D shows a table including a set of predetermined weight scores for the text-styling and text-layout attributes of the characters in ED (301). It will be apparent to one of ordinary skill in the art that other attributes not shown in the table may also be found in the ED (301). As seen in FIG. 3D, attributes that are generally associated with attributes found in titles (i.e., title attributes) are given higher predetermined weight scores. The predetermined weight scores may be set and revised by a user.

FIG. 3E shows a table including the statistical information for the text-styling attributes listed in the table shown in FIG. 3D. As seen in FIG. 3E, each variation and the frequency of each variation of the text-styling attributes are provided. The variation information may be used to determine a variability score of a text-styling attribute. The frequency of a variation reflects the number of characters in the ED that have that variation. For example, assume the ED (301) has a total of 745 characters. As seen in FIG. 3E, all of the characters in the ED (301) have the same OOXML_STYLE_NAME (i.e., style name attribute), FONT_NAME (i.e., font name attribute), and FONT_COLOR (i.e., font color attribute).

FIG. 3F shows a table including the dimensions of the ED content bounding box (303) shown in FIG. 3A. As seen in FIG. 3F, the values are calculated based on the left-most and top-most borders of the ED (301).

FIG. 3G shows a table including the vertical spacing and horizontal spacing information of Paragraphs 1 to 3 of the ED (301) shown in FIG. 3A. As seen in FIG. 3G, the before and after values of the vertical spacing represent the amount of white space above and below a paragraph, respectively. The before and after values of the horizontal spacing represents the leading and trailing whites (307, 309), respectively. The spacing information shown in FIG. 3G may be used to group the lines of text into paragraphs.

In one or more embodiments of the invention, the vertical and horizontal spacing values shown in the table of FIG. 3G may be calculated based on the layout information (317) in FIG. 3B and the ED content bounding box (303) dimensions in FIG. 3F. For example, for paragraph number 1, the layout information (317) indicates that Paragraph 1 starts 2.69 inches from the left-most border of the ED (301) (i.e., the first character in Paragraph 1 starts 2.69 inches from the left-most border of the ED (301)). This value is subtracted by the value of the left border of the ED content bounding box (303) (i.e., 0.99 inches) to result in the leading white space value of 1.69 inches for paragraph 1. Additionally, as seen in FIG. 3B, the width of paragraph 1 is 3.11 inches. Therefore, the last character in Paragraph 1 is 5.8 inches from the left-most border of the ED (301) (i.e., 2.69 inches+ 3.11 inches). As seen in FIG. 3F, the right border of the ED content bounding box (303) ends 7.45 inches from the left-most border of the ED (301). Therefore, the trailing white space value of Paragraph 1 can be calculated as 1.65 as a result of 7.45 inches subtracted by 5.8 inches.

FIG. 3H shows a table including a summary of the vertical spacing in the ED (301) shown in FIG. 3A. The information shown in FIG. 3H may be used to calculate the layout scoring functions as described above in reference to FIG. 1.

FIG. 3I shows a table including a set of relative weight scores for each text-styling and text-layout attributes in the ED (301) shown in FIG. 3A. As shown in FIG. 3I, the method of adjusting the predetermined weight scores as described above in reference to FIG. 1 is applied. Specifically, in one or more embodiments: the predetermined weight score of all text-styling attributes with a variability of 1 may be set to a relative weight score of 0; for the centering attribute, the relative weight score can be computed by scaling the predetermined weight score by a centering score that reflects a paragraph in the ED (106) with the best centering (i.e., the most centered paragraph in the ED (106)); and for the white space attribute, setting the relative weight score to be the same as the predetermined weight score because all documents contain white space.

As seen in FIG. 3I, based on the above adjustment method, some text-styling attributes now have a relative weight score of 0 and the sum of the relative weight scores is no longer equal to 1. The relative weight scores are scaled so that the sum of the relative weight scores equals to 1. The scaled relative weight scores are shown in the right-most column of the table of FIG. 3I.

FIG. 3J shows a table including the centering score of Paragraphs 1 to 3. The information shown in FIG. 3J may be used to calculate the layout scoring functions and the relative weight scores of the text-layout attributes, as described above in reference to FIG. 1. For example, assume the centering score of Paragraph 1 is the maximum centering score of the ED (106) (i.e., Paragraph 1 is the most centered paragraph (502) in the ED (301)). The centering score of Paragraph 1 is used to calculate the relative weight score of the centering attribute. As seen in FIG. 3I, the relative weight score of the centering attribute divided by the predetermined weight score of the centering attribute is 0.99, (i.e., the maximum centering score). Similarly, in one or more embodiments, the centering score of each paragraph may be set as the layout scoring function to calculate the final layout score of the centering attribute. If a paragraph includes more than one centering score, the minimum centering score of the paragraph is set for the layout scoring function.

FIG. 3K shows a table including title confidence scores for Paragraph 1 and Paragraph 2 of the ED (301) shown in FIG. 3A. FIG. 3K further includes one or more values (e.g., styling and layout scoring functions, scaled relative weight scores, final style and layout scores, and text content scores) for each paragraph required to calculate the title confidence scores. As seen in FIG. 3K, Paragraph 1 has a title confidence score of 0.68, which is close to 1 and indicates that there is a high possibility that Paragraph 1 is a title. In comparison, Paragraph 2 has a title confidence score of 0.07, which is close to 0 and indicates there is a high possibility that Paragraph 2 is not a title. Referring back to FIG. 3A, a visual inspection of FIG. 3A reveals that Paragraph 1 (i.e., "Why Dogs are Better than Cats") appears to be a possible title of the ED (301) and Paragraph 2 appears to be a regular sentence.

Figure 4:
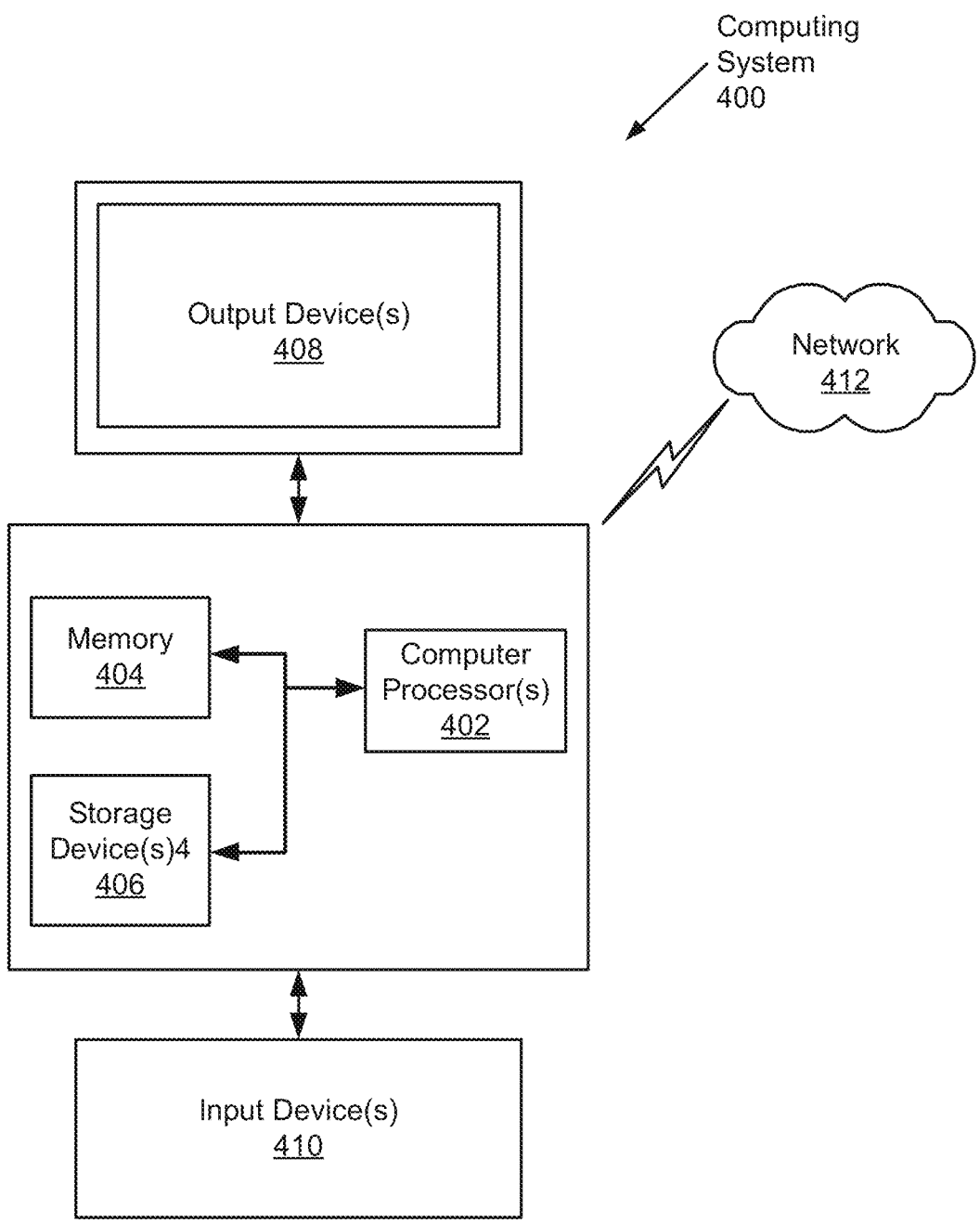
FIG. 4 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and be connected to the other elements over a network (412). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing an electronic document (ED) to infer a title in the ED, wherein the ED comprises a plurality of characters, the method comprising:
   generating a mark-up version of the ED comprising text-styling attributes, text-layout attributes, and text content information of the characters in the ED, wherein
   the characters are grouped into at least a first paragraph and a second paragraph based on the text-layout attributes, and
   each of the text-styling attributes and the text-layout attributes is associated with a predetermined weight score;
   generating statistical information of the text-styling and text-layout attributes;
   calculating, for each of the text-styling and text-layout attributes, a relative weight score based on the predetermined weight scores and the statistical information;
   calculating, for each of the first and second paragraphs:
   a styling criteria score and a layout criteria score based on the statistical information and the relative weight scores;
   a text content score based on the text content information; and
   a title confidence score based on the styling criteria score, the layout criteria score, and the text content score; and generating, for the ED, a metadata including the title confidence score for each of the first and second paragraphs for use in inferring titles in the ED.

2. The method of claim 1, wherein
the text-styling attributes are selected from a group comprising an OOXML style name attribute, a font size attribute, a bold attribute, an underline attribute, a font name attribute, a font color attribute, and a heading tag attribute
the text-layout attributes are selected from a group comprising a centering attribute and a white space attribute, and
the text content information comprises a character count of the plurality of characters in the ED.

3. The method of claim 2, wherein a sum of the predetermined weight scores is 1.

4. The method of claim 1, wherein calculating the relative weight score for each of the text-layout attributes comprises:
setting the predetermined weight score as the relative weight score for a predetermined text-layout attribute of the text-layout attributes; and
for each of the remaining text-layout attributes:
calculating a plurality of layout scoring functions based on the statistical information; and
calculating the relative weight score based on the predetermined weight scores and a maximum layout scoring function of the layout scoring functions.

5. The method of claim 4, wherein calculating the relative weight score for each of the text-styling attributes comprises:
determining, for each of the text-styling attributes, a variability based on the statistical information;
in response to determining that the variability of a text-styling attribute of the text-styling attributes is 1, setting the relative weight score of the text-styling attribute to zero; and
in response to determining that the variability of the text-styling attribute is greater than 1, calculating the relative weight score for the text-styling attribute based on the predetermined weight score.

6. The method of claim 5, wherein in response to the sum of the relative weight scores not being equal to 1, the relative weight scores are scaled to total a sum of 1.

7. The method of claim 1, wherein calculating the styling criteria score for the first paragraph comprises:
calculating, for each of the text-styling attributes, a final style score based on a uniqueness scores and the relative weight scores,
wherein the styling criteria score is a sum of the final style score for each of text-styling attributes.

8. The method of claim 7, wherein
the uniqueness score of a text-styling attribute of the text-styling attributes is based on a distribution ratio and a sparsity score of the text-styling attribute,
the distribution ratio is a ratio of a number of characters with a variation of the text-styling attribute in the first paragraph to a total number of characters in the first paragraph, and
the sparsity score is a complement ratio of a number of characters in the first paragraph having the variation of the text-styling attribute to a total number of characters in the ED.

9. The method of claim 1, wherein calculating the layout criteria score for the first paragraph comprises:
calculating, for each of the text-layout attributes:
a plurality of layout scoring functions based on the statistical information; and
a final layout score based on the relative weight scores and the layout scoring functions, and
wherein the layout criteria score is a sum of the final layout score for each of the text-layout attributes.

10. The method of claim 1, wherein
the ED is a first ED within a collection of EDs comprising a second ED, the second ED comprises:
a third paragraph and a fourth paragraph, and
a metadata including the title confidence score for a third paragraph and a fourth paragraph, and
the first paragraph and the third paragraph include a predetermined search term specified in a request to infer titles in the collection of EDs, and
in response to the title confidence score of the first paragraph being greater than the title confidence score of the third paragraph, the first ED is displayed on a display before the second ED.

11. A non-transitory computer readable medium (CRM) storing computer readable program code for processing an electronic document (ED) to infer a title in the ED embodied therein, wherein the ED comprises a plurality of characters and the computer readable program code causes a computer to:
generate a mark-up version of the ED comprising text-styling attributes, text-layout attributes, and text content information of the characters in the ED, wherein
the characters are grouped into at least a first paragraph and a second paragraph based on the text-layout attributes, and
each of the text-styling attributes and the text-layout attributes is associated with a predetermined weight score;
generate statistical information of the text-styling and text-layout attributes;
calculate, for each of the text-styling and text-layout attributes, a relative weight score based on the predetermined weight scores and the statistical information;
calculate, for each of the first and second paragraphs:
a styling criteria score and a layout criteria score based on the statistical information and the relative weight scores;
a text content score based on the text content information; and
a title confidence score based on the styling criteria score, the layout criteria score, and the text content score; and
generate, for the ED, a metadata including the title confidence score for each of the first and second paragraphs for use in inferring titles in the ED.

12. The non-transitory CRM of claim 11, wherein
the text-styling attributes are selected from a group comprising an OOXML style name attribute, a font size attribute, a bold attribute, an underline attribute, a font name attribute, a font color attribute, and a heading tag attribute
the text-layout attributes are selected from a group comprising a centering attribute and a white space attribute, and
the text content information comprises a character count of the plurality of characters in the ED.

13. The non-transitory CRM of claim 11, wherein calculating the relative weight score for each of the text-layout attributes comprises:
setting the predetermined weight score as the relative weight score for a predetermined text-layout attribute of the text-layout attributes; and for each of the remaining text-layout attributes:
  calculating a plurality of layout scoring functions based on the statistical information; and
  calculating the relative weight score based on the predetermined weight scores and a maximum layout scoring function of the layout scoring functions.

14. The non-transitory CRM of claim 11, wherein calculating the relative weight score for each of the text-styling attributes comprises:
  determining, for each of the text-styling attributes, a variability based on the statistical information;
  in response to determining that the variability of a text-styling attribute of the text-styling attributes is 1, setting the relative weight score of the text-styling attribute to zero; and
  in response to determining that the variability of the text-styling attribute is greater than 1, calculating the relative weight score for the text-styling attribute based on the predetermined weight score.

15. The non-transitory CRM of claim 11, wherein
  the ED is a first ED within a collection of EDs comprising a second ED, the second ED comprises:
    a third paragraph and a fourth paragraph, and
    a metadata including the title confidence score for a third paragraph and a fourth paragraph, and
  the first paragraph and the third paragraph include a predetermined search term specified in a request to infer titles in the collection of EDs, and
  in response to the title confidence score of the first paragraph being greater than the title confidence score of the third paragraph, the first ED is displayed on a display before the second ED.

16. A system for processing an electronic document (ED) to infer a title in the ED, wherein the ED comprises a plurality of characters, the system comprising:
  a memory; and
  a computer processor connected to the memory that:
    generates a mark-up version of the ED comprising text-styling attributes, text-layout attributes, and text content information of the characters in the ED, wherein
      the characters are grouped into at least a first paragraph and a second paragraph based on the text-layout attributes, and
      each of the text-styling attributes and the text-layout attributes is associated with a predetermined weight score;
    generates statistical information of the text-styling and text-layout attributes;
    calculates, for each of the text-styling and text-layout attributes, a relative weight score based on the predetermined weight scores and the statistical information;
    calculates, for each of the first and second paragraphs:
      a styling criteria score and a layout criteria score based on the statistical information and the relative weight scores;
      a text content score based on the text content information; and
      a title confidence score based on the styling criteria score, the layout criteria score, and the text content score; and
    generates, for the ED, a metadata including the title confidence score for each of the first and second paragraphs for use in inferring titles in the ED.

17. The system of claim 16, wherein
  the text-styling attributes are selected from a group comprising an OOXML style name attribute, a font size attribute, a bold attribute, an underline attribute, a font name attribute, a font color attribute, and a heading tag attribute
  the text-layout attributes are selected from a group comprising a centering attribute and a white space attribute, and
  the text content information comprises a character count of the plurality of characters in the ED.

18. The system of claim 16, wherein calculating the relative weight score for each of the text-layout attributes comprises:
  setting the predetermined weight score as the relative weight score for a predetermined text-layout attribute of the text-layout attributes; and
  for each of the remaining text-layout attributes:
    calculating a plurality of layout scoring functions based on the statistical information; and
    calculating the relative weight score based on the predetermined weight scores and a maximum layout scoring function of the layout scoring functions.

19. The system of claim 16, wherein calculating the relative weight score for each of the text-styling attributes comprises:
  determining, for each of the text-styling attributes, a variability based on the statistical information;
  in response to determining that the variability of a text-styling attribute of the text-styling attributes is 1, setting the relative weight score of the text-styling attribute to zero; and
  in response to determining that the variability of the text-styling attribute is greater than 1, calculating the relative weight score for the text-styling attribute based on the predetermined weight score.

20. The system of claim 16, wherein
  the ED is a first ED within a collection of EDs comprising a second ED, the second ED comprises:
    a third paragraph and a fourth paragraph, and
    a metadata including the title confidence score for a third paragraph and a fourth paragraph, and
  the first paragraph and the third paragraph include a predetermined search term specified in a request to infer titles in the collection of EDs, and
  in response to the title confidence score of the first paragraph being greater than the title confidence score of the third paragraph, the first ED is displayed on a display before the second ED.

* * * * *